R. A. Webster,
Inner-Sole.
No. 74,645. Patented Feb. 18, 1868.
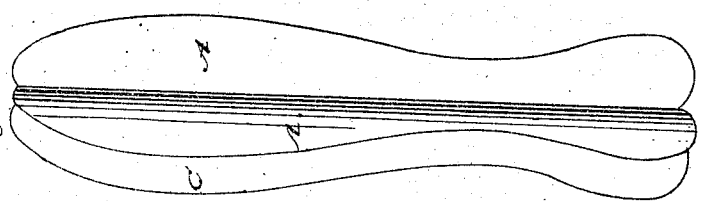
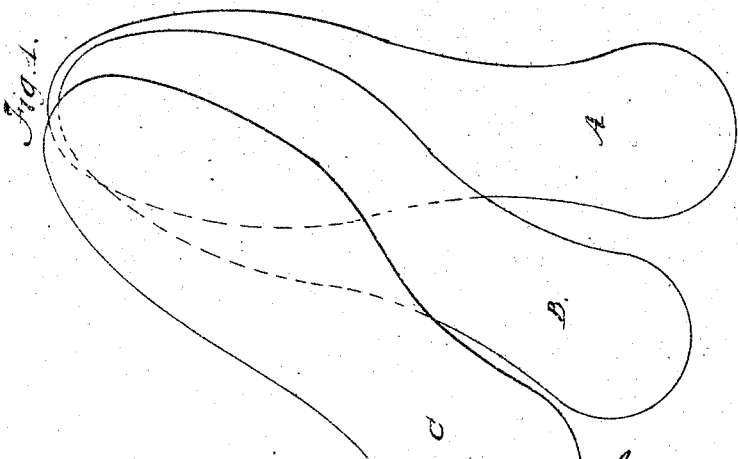

United States Patent Office.

R. A. WEBSTER, OF SANDISFIELD, MASSACHUSETTS.

Letters Patent No. 74,645, dated February 18, 1868.

IMPROVEMENT IN INNER SOLE.

The Schedule referred to in these Letters Patent and making part of the same.

TO ALL WHOM IT MAY CONCERN:

Be it known that I, R. A. WEBSTER, of Sandisfield, in the county of Berkshire, and State of Massachusetts, have invented a new and improved Inner Sole; and I do hereby declare that the following is a full, clear, and exact description thereof, which will enable others skilled in the art to make and use the same, reference being had to the accompanying drawings, forming part of this specification.

This invention relates to a new and improved method of constructing inner soles for boots or shoes, whereby the same are more cheaply made, are more durable, and are rendered impervious to water. It consists of one or more pieces of wood, or a thin piece of wood and a piece of felting or cloth, between which is a thin layer of gutta percha or rubber, by the warming of which all the several layers are firmly connected together. In the accompanying plate of drawings—

Figure 1 represents a plan view of the parts of which the sole is composed in position to be placed together.

Figure 2 represents a view of the edge of the same, the part being partly separated to show the inner or gutta-percha layer.

Similar letters of reference indicate corresponding parts.

A is a thin sole-shaped piece of wood. C is another thin sole-shaped piece of wood, or a sole-shaped piece of cloth or felting. B is a thin fabric, of gutta percha, or other substance with like qualities. Upon the thin piece of wood or veneering A is laid a thin layer of gutta percha, or other substance having like qualities, B, of like shape and size, and upon said layer B another like piece of wood or veneering, or belting or cloth, or other suitable material, which, being pressed together and heated, the layer of gutta percha or rubber, or other substance, B, is softened, and adheres to the sides of the parts A and C, thereby cementing them firmly together into a sole or other article, and rendering the same impervious to water.

Constructed as above described, it forms a light, thin, and durable substance, impervious to water, suitable for the inner soles of boots or shoes, or for any purpose where the above qualities are required.

I claim as new, and desire to secure by Letters Patent—

As a new article of manufacture, an inner sole, composed of two strips of wood, A C, secured together by means of the gutta-percha strip B, heated, and placed between them, as herein shown and described for the purpose specified.

R. A. WEBSTER.

Witnesses:
D. W. J. SMITH,
WELLINGTON SMITH.